May 21, 1929.  J. F. O'CONNOR  1,713,915
SHOCK ABSORBING MECHANISM FOR AUTOMOBILES
Filed Nov. 12, 1926
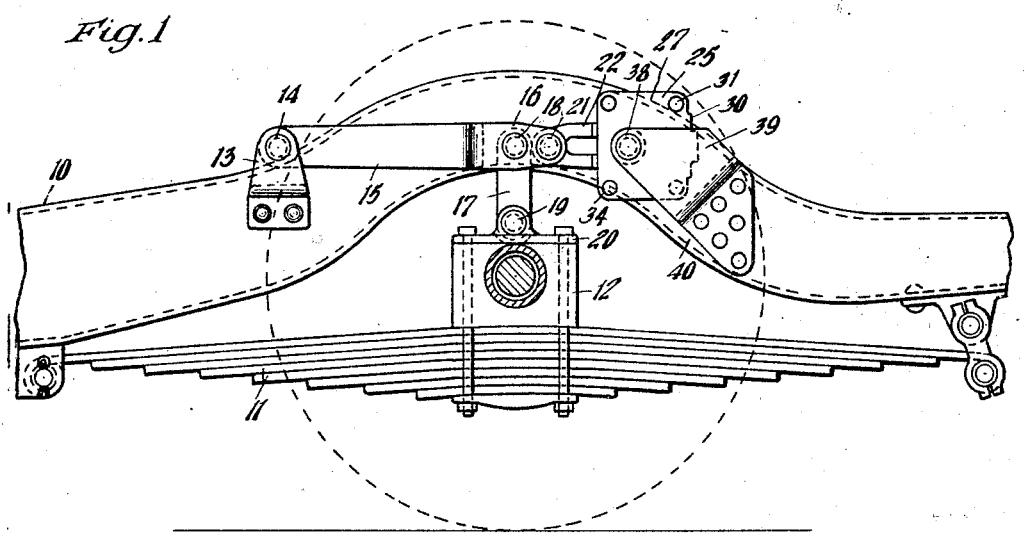
Fig. 1
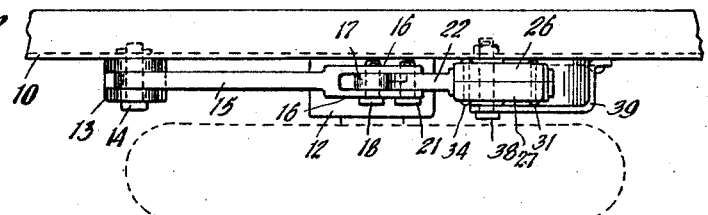
Fig. 2
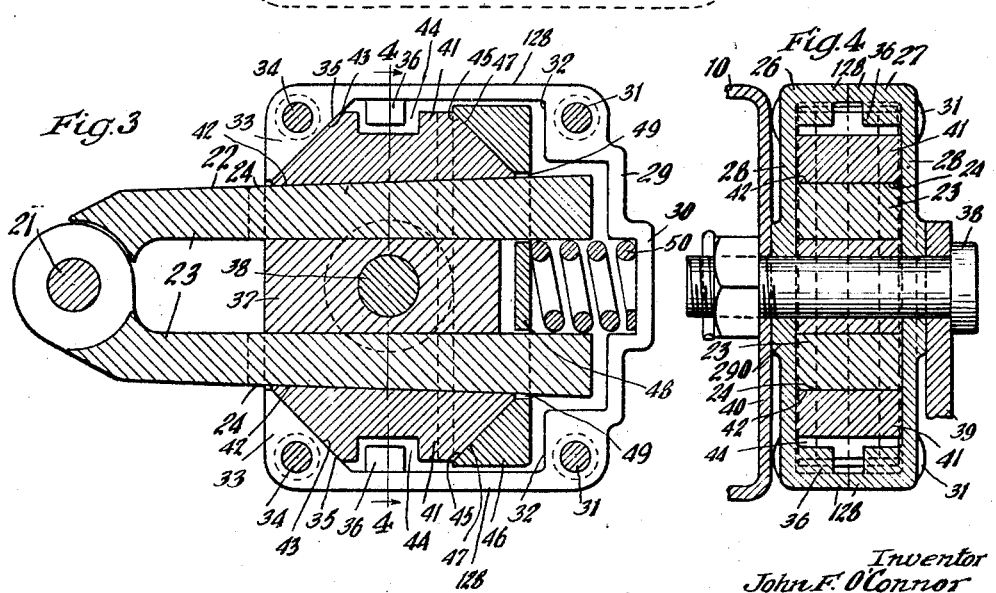
Fig. 3
Fig. 4
Witness
Wm. Geiger
Inventor
John F. O'Connor
By George I. Haight
His Atty.

Patented May 21, 1929.

1,713,915

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

SHOCK-ABSORBING MECHANISM FOR AUTOMOBILES.

Application filed November 12, 1926. Serial No. 147,903.

This invention relates to friction shock absorbing mechanism for automobiles.

An object of the invention is to provde a shock absorbing mechanism to be used in connection with motor vehicles, especially of the bus types, and adapted to be associated therewith in such manner as to be operable by the relative movement between the usual axle housing and the chassis of the vehicle, and aid the usual springs which support the axle housing in absorbing shocks transmitted thereto through inequalities in the roadway.

Another object of the invention is to provide a mechanism of this character which affords frictional resistance to the relative movement between the axle housing and the chassis of the vehicle when the same approach each other and when they become separated with respect to each other, said mechanism including a toggle arrangement for imparting the required movement to the parts.

Other and further objects of the invention will more clearly appear from the description and claims hereinafter following.

In the drawings, Figure 1 is a side elevational view of a portion of the chassis, the usual rear spring assembly, and axle housing, and showing the invention applied in operative position. Figure 2 is a top plan view of the portions of the mechanism illustrated in Figure 1. Figure 3 is a vertical sectional view of the invention taken through the housing of the mechanism and showing the interior arrangement of the friction elements and actuating wedge means. Figure 4 is a vertical transverse sectional view substantially on the line 4—4 of Figure 3.

As shown in the drawings, 10 represents a fragment of the side frame forming part of the chassis of an automobile; 11 represents a spring assembly attached to the frame member in the usual manner, and 12 denotes an axle housing carried by the spring assembly 11.

In carrying out the invention there is provided a supporting bracket 13 secured to the frame 10, between the spaced ears of which is pivotally connected by means of a pivot pin 14 a link 15, the free end of said link being provided with furcations 16—16. Intermediate the length of the furcations 16—16 there is pivotally connected the upper end of an actuating link 17, by means of the pin 18, the lower end of the link 17 being pivotally connected, as indicated at 19, to a plate 20 secured to the axle housing 12.

Pivotally secured between the outer ends of the furcations 16—16, by means of a pivot pin 21, is the end portion of a wedge element 22. The wedge element 22 comprises two spaced legs 23—23, each of which has an outer wedge surface 24 which diverges from a point adjacent the pivot pin 21 toward its end. The wedge element 22 extends inwardly into a housing 25. The housing 25 is of two-part construction comprising oppositely disposed mated sections 26 and 27, only one of which will be described in detail. The section 26 is roughly of rectangular formation, and includes a vertical wall 28 provided with a hub or boss 290 and formed integrally with the vertical wall 28 are angularly arranged top and bottom walls 128—128. The section 26 also includes a rear wall 29 having a central offset 30 providing one-half of a spring pocket, and at the corners provided by the walls 28 and 29 are webs 32—32 providing material through which rivets 31—31 may project, the portions 32—32 providing stops in a manner hereinafter described. The end of the section 26 opposite the wall 29 is also provided with spaced webs 33—33 through which the rivets 34—34 may be projected, and said webs are provided with wedge faces 35—35 adapted for co-operation with friction shoes hereinafter referred to. The walls 128 are also provided with lugs 36—36 which are utilized as stops. The section 27 of the casing is identical with the section 26, except for its opposite disposition, and contains all of the parts mentioned in connection with the section 26, it being understood that when the two sections are placed together and secured by means of the rivets 31—31 and 34—34, that the various parts coincide and form the complete housing.

Disposed in said housing between the legs 23—23 of the actuating wedge 22 is a block 37, and extending through the block 37 and the side walls 28 of the sections 26 and 27 and bosses 290—290 is a pivot pin 38 by means of which the housing is pivotally connected to a supporting bracket 39 and the web 40 of the member 10.

Disposed upon the outer sides of the legs 23—23 of the actuating wedge member 22 are friction shoes 41—41. The shoe 41 at one side of the actuating wedge member 22 is provided with a friction surface 42 adapted to co-act with the diverging surface of the adjacent leg 23 of the member 22, and is further provided with a friction face 43 adapted to co-act with the friction face 35 of the housing, the shoe having cut-out portion 44 adapted to permit movement of the shoe with reference to the stop 36 upon the wall of the housing. The friction shoe is also provided with a friction surface 45 adapted to cooperate with a wedge member 46. The friction shoe 41 at the opposite outer side of the other leg 23 of the member 22 is identical with the friction shoe described in detail, except for its opposite disposition, and similar reference characters will be utilized to designate like parts.

The wedge member 46 comprises a rear wall 48 having apertures 49 therein to permit passage of the legs 23—23 of the member 22, and said wedge member is provided with oppositely extending wedge surfaces 47 adapted to co-act with the wedge surfaces 45 of the friction shoes 41—41. A coiled spring 50 is disposed in the pocket 30 of the housing and bears upon the rear wall 48 of the wedge member 46.

In operation, upon relative approach of the axle housing 12 and the frame member 10, the link 17 transmits upward swinging movement to the link 15 about the pivot pin 14 which causes outward and upward movement of the wedging member 22, which causes the housing 25 to swing about the pivot 38. During the outward movement of the wedge member 22, due to the diverging outer surfaces of the legs 23—23, the shoes 41—41 will be wedged toward the walls 128—128 of the casing, bringing about frictional engagement between the wedge surfaces 35—35 and the friction surfaces 43—43 of the friction shoes 41—41. This movement will also bring about frictional resistance between the surfaces 42—42 of the shoes 41—41 with the diverging outer surfaces of the legs 23—23 of the member 22. During this movement the shoes 41—41 will travel toward the wall 29 of the casing, and the friction surfaces 45—45 of the shoes 41—41 co-act with the wedge surfaces 47—47 of the wedge member 46, which latter is resisted by the spring 50. Movement of the friction shoes 41—41, and of the wedge member 46, are limited by the stops 36—36 and 32—32 respectively. When the axle housing and frame 10 resume their normal positions, the member 22 will be forced inwardly relieving the pressure, and permitting the parts to be returned to their original positions under the influence of the spring 50.

Upon relative separation of the axle housing 12 and frame member 10 beyond that which ordinarily occurs the link 15 will be swung downwardly about the pivot 14 through its connection with the link 17, and this movement will result in outward and downward movement of the member 22, the housing swinging about the pin 38, and the same action which was described in detail upon the approach of the axle housing 12 and member 10 will occur, and frictional resistance will be developed to excessive separation of the axle housing 12 and member 10.

By this arrangement it will be observed that a toggle effect is provided which brings about movement of the wedge member 22 in the same direction whether the member 10 and axle housing separate beyond normal position, or approach beyond normal position, thereby efficiently developing frictional resistance to movement of the axle housing in opposite directions with reference to the member 10 in a simple and effective manner.

While I have herein shown and described what I consider the preferred manner of carrying out the invention, the same is merely illustrative, and I contemplate all changes and modifications which come within the scope of the claims appended hereto.

I claim:

1. In a device of the character described, the combination with a pivotally mounted housing; of a wedge element having spaced legs extending into said housing; a block disposed between the legs of said member, said block being carried by said housing; friction means co-acting with the legs of said wedge element to develop frictional resistance thereon when reciprocated in one direction; and swingable means for imparting reciprocation to said wedge element.

2. In a device of the character described, the combination with a frame member, and a spring member of a vehicle; of a housing pivotally mounted upon said frame by means of a pivot pin extending therethrough; a block on said pin; a wedge element having spaced legs straddling said block; friction shoes co-acting with the legs of said wedge element; wedge surfaces co-acting with the friction surfaces of said shoes, certain of said wedge surfaces being yieldably urged toward said shoes; a link pivotally connected to said frame at a point spaced from said housing, the free end of said link having a pivotal connection with the outer end of said wedge element; and an actuating link pivotally connected to said link intermediate its end, and having a pivotal connection with said spring member.

3. A shock absorbing device including a housing; of a friction member extending into said housing and movable lengthwise relatively thereto, said friction member comprising two spaced arms; a fixed friction block interposed between said arms, said block and arms having co-operating friction surfaces; friction shoes within the housing and co-operating with said arms, said shoes and arms having engaging sets of friction surfaces inclined with respect to said first named friction surfaces, said friction shoes having wedge faces at the opposite ends thereof, the housing having fixed wedge means co-operating with the wedge faces at one end of the shoes; a wedge member having wedging engagement with the wedge faces at the other end of the shoe; and spring means within the housing opposing movement of said wedge member.

In witness that I claim the foregoing I have hereunto subscribed my name this 8th day of November, 1926.

JOHN F. O'CONNOR.